US012259197B2

(12) United States Patent
Haavisto et al.

(10) Patent No.: US 12,259,197 B2
(45) Date of Patent: Mar. 25, 2025

(54) PLATE HEAT EXCHANGER AND ITS USE AS LIQUEFIED NATURAL GAS VAPORIZER

(71) Applicant: VAHTERUS OY, Kalanti (FI)

(72) Inventors: Valtteri Haavisto, Rusko (FI); Kalle Vähätalo, Taivassalo (FI)

(73) Assignee: VAHTERUS OY, Kalanti (FI)

( * ) Notice: Subject to any disclaimer, the term of this patent is extended or adjusted under 35 U.S.C. 154(b) by 189 days.

(21) Appl. No.: 17/784,353

(22) PCT Filed: Dec. 11, 2020

(86) PCT No.: PCT/FI2020/050830
§ 371 (c)(1),
(2) Date: Jun. 10, 2022

(87) PCT Pub. No.: WO2021/116534
PCT Pub. Date: Jun. 17, 2021

(65) Prior Publication Data

US 2023/0046534 A1 Feb. 16, 2023

(30) Foreign Application Priority Data

Dec. 12, 2019 (FI) ..................................... 20196074

(51) Int. Cl.
*F28F 9/02* (2006.01)
*F17C 7/04* (2006.01)
(Continued)

(52) U.S. Cl.
CPC .............. *F28D 9/0043* (2013.01); *F17C 7/04* (2013.01); *F17C 9/02* (2013.01); *F28D 9/0006* (2013.01);
(Continued)

(58) Field of Classification Search
CPC ........ F28F 9/0246; F28F 9/0234; F28F 9/006; F28F 9/0043; F28F 9/027; F28F 9/0273; F17C 7/04
See application file for complete search history.

(56) References Cited

U.S. PATENT DOCUMENTS 4,917,181 A * 4/1990 Kiernan, Jr. .......... F28D 9/0012 165/DIG. 357
5,368,095 A * 11/1994 Kadambi .................. F02C 7/08 165/83
(Continued)

FOREIGN PATENT DOCUMENTS

CN 102265109 A 11/2011
CN 104487796 A 4/2015
(Continued)

OTHER PUBLICATIONS

International Search Report and Written Opinion of the ISA for PCT/FI2020/050830, mailed Mar. 18, 2021, 20 pages.
(Continued)

*Primary Examiner* — Devon Lane
(74) *Attorney, Agent, or Firm* — NIXON & VANDERHYE

(57) ABSTRACT

A plate heat exchanger, which includes a flexible structure and/or a heating channel between the first support end plate of the plate pack and the first end plate of the outer casing, and/or an inner tube arranged inside the inlet connection tube of the first heat exchange medium for improving plate heat exchanger's ability to withstand thermal stresses caused by temperature differences, e.g. when using in heating of liquefied natural gas.

4 Claims, 3 Drawing Sheets

(51) Int. Cl.
*F17C 9/02* (2006.01)
*F28D 9/00* (2006.01)
*F28D 21/00* (2006.01)

(52) U.S. Cl.
CPC .......... *F28F 9/0234* (2013.01); *F28F 9/0246* (2013.01); *F17C 2265/05* (2013.01); *F28D 2021/0033* (2013.01); *F28F 2255/02* (2013.01); *F28F 2265/26* (2013.01)

(56) References Cited

U.S. PATENT DOCUMENTS

2002/0174978 A1* 11/2002 Beddome .............. F28D 9/0043 165/906
2003/0000688 A1* 1/2003 Mathur ................. F28D 9/0043 165/167
2003/0010483 A1* 1/2003 Ikezaki ................. F28F 9/0273 165/174
2003/0116305 A1 6/2003 Beddome
2003/0159807 A1* 8/2003 Ayres .................... F28F 9/0246 165/81
2005/0224070 A1* 10/2005 Hanai .................. F28D 9/0062 126/350.2
2005/0257921 A1* 11/2005 Hu ........................ F28D 1/0443 165/140
2011/0259562 A1* 10/2011 Blomgren ............... F28F 9/005 165/170
2015/0144313 A1 5/2015 Henriksson
2015/0168085 A1 6/2015 Wagner
2017/0356597 A1* 12/2017 Nevison .............. E21B 43/2607
2019/0041137 A1* 2/2019 Stewart ................... F28F 21/06

FOREIGN PATENT DOCUMENTS

JP S62242791 A 10/1987
JP H06257983 A 9/1994
JP H07 229687 8/1995
JP 2012512377 A 5/2012
WO 2015/042721 4/2015
WO WO-2015042721 A1 * 4/2015 ............. F28D 9/005

OTHER PUBLICATIONS

Search Report for FI20196074 dated Jul. 10, 2020, 1 page.
Office Action, issued in Japanese Patent Application No. 2022-535789 dated Dec. 3, 2024.
Office Action, issued in Chinese Patent Application No. 202080085748X dated Dec. 31, 2024.

* cited by examiner

PLATE HEAT EXCHANGER AND ITS USE AS LIQUEFIED NATURAL GAS VAPORIZER

This application is the U.S. national phase of International Application No. PCT/FI2020/050830 filed Dec. 11, 2020 which designated the U.S. and claims priority to FI patent application No. 20196074 filed Dec. 12, 2019, the entire contents of each of which are hereby incorporated by reference.

FIELD OF THE INVENTION

The present invention relates to a plate heat exchanger and its use as liquefied natural gas vaporizer.

BACKGROUND OF THE INVENTION

The global request of natural gas (NG) is continuously increasing, since it is a clean fuel. Where natural gas pipelines are not feasible or do not exist, liquefied natural gas is a way to move natural gas from producing regions to the consumption places. Typically, it is cooled down to liquid form (approximately −162° C.) for ease and safety of non-pressurized storage or transport. In consumption places, liquefied natural gas (LNG) is turned back into gas by warming up to normal temperature to be re-gasified and used as a fuel.

Different kind of LNG vaporizers are used to heat LNG to normal temperature. Plate and Shell-type heat exchangers are one type of the heat exchangers, which can be used to warm LNG back into gas. Plate and Shell heat exchanger is a welded heat exchanger, which comprises a plate pack and an outer casing surrounding the plate pack. The outer casing comprises a first end plate and a second end plate and a shell connecting said end plates. Inlet and outlet connection tubes for the heat exchange medium flowing inside the plate pack are arranged through an end plate of the outer casing. Typically, the inlet connection tube of the plate pack and the end plate of the outer casing and the support end plate of the plate pack are attached tightly, e.g. welded, to each other in Plate and Shell-type heat exchangers, and hence the thermal movement is not necessarily possible in every direction without causing stress to the materials. When said heat exchanger structure is used as LNG vaporizer, huge temperature differences may cause stress on the materials and their joints, and eventually stress may break the structure of the heat exchanger. Especially, the temperature difference between the fluids at the point of the inlet connection tube for supplying LNG into the vaporizer may be close to 200 degrees.

SUMMARY OF THE INVENTION

It is an object of the present invention to reduce or even eliminate the above-mentioned problems appearing in prior art.

The object of the present invention is to present plate heat exchanger structures having an improved ability to withstand thermal stresses caused by temperature differences, e.g. huge temperature differences present in heating of liquefied natural gas.

Especially, the object of the present invention is to present novel structures for an end of the Plate and Shell—type heat exchangers which have an improved ability to withstand thermal stresses caused by temperature differences, e.g. when using in heating of liquefied natural gas.

In order to achieve among others the objects presented above, the invention is characterized by what is presented in the characterizing parts of the enclosed independent claims.

The embodiments and advantages mentioned in this text relate, where applicable, both to the plate heat exchanger and the uses according to the invention, even though it is not always specifically mentioned.

Typical plate heat exchanger according to the present invention comprises

- a plate pack formed of heat exchanger plates having at least two openings and arranged on top of each other, wherein the plate pack comprises a first end and a second end in the length direction of the plate pack, and which plate pack comprises a first support end plate arranged on the first end of the plate pack, a second support end plate (7*b*) arranged on the second end of the plate pack and flow passages for a first heat exchange medium inside the plate pack are formed of the openings of the heat exchange plates arranged on top of each other,
- an outer casing surrounding the plate pack, which outer casing comprises a first end plate and a second end plate and a shell connecting said first and second end plates,
- inlet connection tube and outlet connection tube for a first heat exchange medium, arranged through an end plate of the outer casing and arranged in connection with the flow passages of the plate pack, and
- inlet connection tube and outlet connection tube for a second heat exchange medium arranged through the outer casing and arranged in connection with the inside of the outer casing, i.e. with the outside of the plate pack, and wherein the inlet connection tube of the first heat exchange medium is arranged through the first end plate of the outer casing and in connection with the first support end plate of the plate pack, and the plate heat exchanger according to the present invention further comprises

- a flexible structure, which is arranged between the first support end plate of the plate pack and the first end plate of the outer casing, and/or
- a heating channel between the first support end plate of the plate pack and the first end plate of the outer casing and/or at least partly around the inlet connection tube of a first heat exchange medium, and/or
- an inner tube, which is arranged inside the inlet connection tube of the first heat exchange medium and which elongates at least partly inside the flow passage of the plate pack.

Typically, a plate heat exchanger according to the present invention is used as liquefied natural gas (LNG) vaporizer.

The structure of the plate heat exchanger according to the present invention is based on decreasing the effects of thermal movement which are directed to the structures due to the temperature difference between the first and the second heat exchange medium. According to the present invention, the heat exchanger structure is improved by arranging at least one the following structures in the plate heat exchanger

- a flexible structure between the first support end plate of the plate pack and the first end plate of the outer casing,
- a heating channel between the first support end plate of the plate pack and the first end plate of the outer casing and/or at least partly around the inlet connection tube of a first heat exchange medium, an inner tube inside the inlet connection tube for the first heat exchange medium, which elongates at least partly inside the flow passage of the plate pack.

A plate heat exchanger according to the present invention may comprise one, two or all three structures according to the present invention arranged in an end of the plate heat exchanger, through which the inlet connection tube for a first heat exchange medium is arranged. The presented improved structures provide easy and simple modifications to the end plate structure of the plate heat exchanger.

DESCRIPTION OF THE DRAWINGS

The invention will be described in more detail with reference to appended drawings, in which.

DETAILED DESCRIPTION OF THE INVENTION

Figure 1:
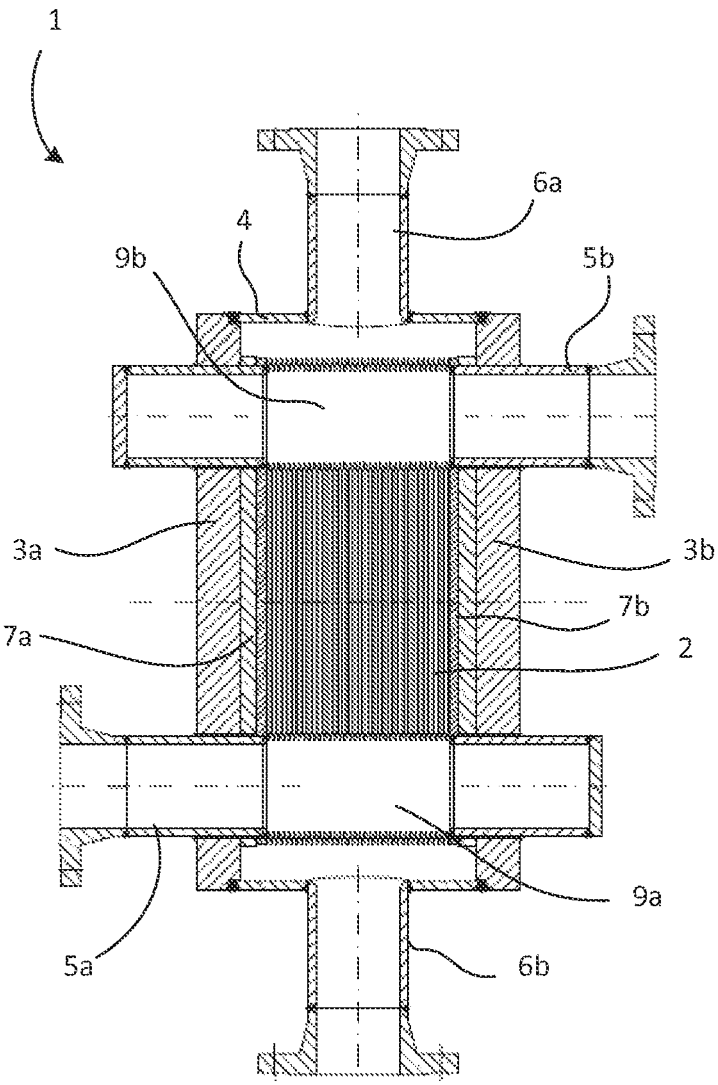
FIG. 1 shows an exemplary embodiment of a structure of Plate and Shell heat exchanger.

Plate and Shell-type plate heat exchanger comprises a plate pack formed of heat exchange plates and an outer casing surrounding the plate pack. The outer casing comprises a first end plate and a second end plate and a shell connecting said end plates. The plate pack is typically fitted inside a cylindrical shell functioning as a pressure vessel. Plate and Shell-type heat exchanger are typically completely welded heat exchangers.

In the Plate and Shell -type heat exchanger according to the present invention a plate pack is formed of heat exchanger plates arranged on top of each other, wherein the plate pack comprises a first end and a second end in the length direction of the plate pack. A length direction of the plate pack refers to the direction of the stack of the superimposed plate heat exchanger plates. In a typical embodiment according to the present invention the plate pack further comprises a first support end plate arranged on the first end of the plate pack and a second support end plate arranged on the second end of the plate pack. For example, the welded plate pack consists of circular heat exchange plates. The plate pack is made up of several plate pairs of the heat exchange plates. Each plate pair is formed of two heat exchange plates that are attached, preferably welded together at least at their outer periphery. Each heat exchange plate has at least two openings for the flow of the first heat exchange medium. Adjacent plate pairs are attached together by attaching the openings of two adjacent plate pairs to each other. Thus, a plate pack is formed of heat exchange plates so that heat exchange plates are attached to each other alternately at the openings of the plates and at the perimeters of the plates. In said plate pack, the first heat exchange medium can flow from a plate pair to another via the openings inside the plate pack of the heat exchanger, wherein there is flow passages formed of the openings of the heat exchange plates arranged on top of each other. The inlet and outlet connection tubes for a first heat exchange medium are arranged in connection with the flow passages of the plate pack, i.e. with the inner parts of the plate pairs. The primary circuit of the plate heat exchanger is thus formed between the inlet and outlet connection tubes of the first heat exchange medium.

In the Plate and Shell-type heat exchanger according to the present invention, the second heat exchange medium is arranged to flow inside the shell in the spaces between the plate pairs. The inlet and outlet connection tubes for the second heat exchange medium are arranged through the outer casing and in connection with the inner side of the shell, i.e. with the outer side of the plate pairs of the plate pack. In other words, the secondary circuit of the plate heat exchanger is formed between the inlet connection tube and outlet connection tube of the second heat exchange medium, inside the shell, in the spaces between the plate pairs. Typically, the primary and secondary circuits are separate from each other, i.e. the first heat exchange medium flowing in the inner part of the plate pack cannot get mixed with the second heat exchange medium flowing in the shell, i.e. outside the plate pack. Thus, the first primary side heat exchange medium flows in every other plate space and the second secondary side heat exchange medium flows in every other plate space of the plate heat exchanger.

According to the present invention, a longitudinal direction, i.e. a length direction of the plate pack is substantially same as the longitudinal direction of the shell. According to a preferred embodiment of the present invention, the plate pack is mainly circular cylinder in shape and a shell is a cylindrical shell, wherein a cylindrical plate pack formed by heat exchange plates arranged on top of each other is arranged inside the functional part of cylindrical shell so that the longitudinal direction of the plate pack is the same as the longitudinal direction of the cylindrical shell.

According to an embodiment of the present invention a stress caused by thermal movement is prevented and/or eliminated by arranging a flexible structure between the first support end plate of the plate pack and the first end plate of the outer casing. The first end plate refers herein to the end plate of the outer casing through which the inlet connection tube of the first heat exchange medium is arranged, and the first support plate of the plate pack is the support plate of the plate pack which is arranged also in connection with the inlet connection tube of the first heat exchange medium. A flexible structure can be any suitable reversible flexible structure arranged between the first support end plate of the plate pack and the first end plate of the outer casing, which has ability to compensate thermal movement. According to an embodiment of the present invention a flexible structure comprises a spring structure and/or a flexible plate structure, which can be bent and/or move without breaking. In an embodiment of the present invention, a flexible structure is arranged between the first support end plate of the plate pack and the first end plate of the outer casing through which the inlet connection tube of the first heat exchange medium is arranged, and its size is substantially same as the size of the first support end plate of the plate pack, i.e. it is arranged on the whole area between the first support end plate of the plate pack and the first end plate of the outer casing.

Further, in the plate heat exchanger structure according to the present invention, the structure can be improved against thermal stress by the position of the welds in combination with the presented additional flexible structure. According to an embodiment of the present invention the flexible structure is not tightly attached to the inlet connection tube of the first heat exchange medium and/or to the end plate of the outer casing for allowing movement of the flexible structure. There can be welded joint between the flexible structure and the inlet connection tube of the first heat exchange medium and/or the end plate of the outer casing, but it is welded only in some points wherein the reversible movement of the flexible structure is still allowed. The heat exchanger according to the present invention is completely welded structure also with the additional flexible structure.

According to another embodiment of the present invention for inhibiting and/or eliminating stress caused by thermal movement in the end structures of the plate heat exchanger the surroundings of the inlet tube connection of the first heat exchange medium is heated. By arranging a heating channel at least partly around the inlet tube and/or between the first support end plate of the plate pack and the first end plate of the outer casing, it can be reduced and/or prevented large temperature differences at the connection point of the inlet connection tube and the plate pack structures. The first end plate refers herein to the end plate of the outer casing through which the inlet connection tube of the first heat exchange medium is arranged, and the first support end plate of the plate pack is the support plate of the plate pack which is arranged also in connection with the inlet connection tube of the first heat exchange medium. According to an embodiment of the present invention, the plate heat exchanger comprises a heating channel formed in the first support end plate and/or in the end plate of the outer casing, through which the inlet connection tube of a first heat exchange medium is arranged. According to an embodiment of the present invention a heating channel is machined in the first support end plate of the plate pack and/or in the end plate of the outer casing, wherein a warm fluid can be flowed and heated the surroundings of the inlet connection tube. A heating channel can be a groove or corresponding structure which is machined in the first support end plate of the plate pack and/or into the end plate of the outer casing and which provides a route for a heating fluid to flow. The structure and the dimensions of the heating channel(s) can vary.

In an embodiment of the present invention, a heating channel is also formed at least partly around the inlet connection tube of a first heat exchange medium. In an embodiment of the present invention, a heating channel is arranged at least partly to circulate the inlet connection tube, wherein a heating fluid can flow inside the heating channel arranged between the first support end plate of the plate pack and the first end plate of the outer casing from other edge of the end plate, circulate the inlet connection tube at least partly, and flow through the heating channel out from the other edge of the end plate. According to an embodiment of the present invention, a heating channel around the inlet tube can be simply made by machining larger opening in the end plate of the outer casing, at least a part of the length direction of the opening. A height and a width of the heating channel around the inlet connection tube can vary. According to an embodiment of the present invention, a heating channel is arranged around the inlet connection tube in the whole length of the inlet connection tube.

According to an embodiment of the present invention a heating channel is arranged to be in connection with the inside of the shell, wherein a heating fluid or medium to be flown in the heating channel is same fluid or medium which flows inside the shell. Hence, guiding a heating fluid or medium inside the heating channel can be simply made. Further, the heating channel can be easily made by machining standard parts of the plate heat exchanger as presented above. The heating channel construction according to the present invention provide easy embodiment for preventing damages caused by thermal stress.

According to yet another embodiment of the present invention for inhibiting and/or eliminating stress caused by thermal movement in the end structures of the plate heat exchanger, a first heat exchange medium to be heated inside the plate pack is conveyed into the plate pack with an inner tube that distributes the first heat exchange medium flow deeper into the plate pack. A plate heat exchanger according to an embodiment of the present invention comprises an inner tube, which is arranged inside the inlet connection tube of the first heat exchange medium and elongates at least partly inside the flow channel of the plate pack. Thus, the inlet connection tube for a first heat exchange medium is at least partly double walled, which raises the temperature of the original single inlet connection tube since the gas between the structures acts as an insulator, and therefore helps the structure withstand thermal stresses and movement. In a preferred embodiment according to the present invention, an inlet connection tube for a first heat exchange medium is double walled in substantially the whole length of the inlet connection tube.

According to an embodiment of the present invention, an end of the inner tube is attached to the inlet connection tube of the first heat exchange medium. Typically, an inner tube is attached to the inlet connection tube of the first heat exchange medium only from one end of the inner tube, which elongates outside from the end plate of the plate heat exchanger. According to an embodiment of the present invention, when the inner tube is arranged inside the flow channel of the plate pack, the first plate pairs are plugged wherein the entering of the first heat exchange medium into them is blocked. Therefore, according to an embodiment of the present invention the inner tube is attached to the plate pack inside the flow channel of the plate pack by a gasket or an elastic structure arranged around the inner tube, which at same time blocks the flow to inside plate pack and attaches inner tube to the plate pack. Thus, the inner tube structure according to the present invention is a flexible structure which withstands thermal movement caused by large temperature differences. In an embodiment of the present invention, e.g. 1-5 of the first flow channels inside the plate pack are closed, seen from the direction of the inlet tube for the first heat exchange medium, by a gasket or corresponding structure arranged around the inner tube. A gasket or corresponding structure keeps inner tube in its place but also withstand thermal movement. This also inhibits damages caused by the large temperature differences since the first plate pairs are not open for the first heat exchange medium and so they functioning as an insulation layer in direction to the end structures of the plate heat exchanger.

According to an embodiment of the present invention, an inner tube comprises openings which forms flow channels into the flow channels inside the plate pack. Hence, the inner tube can elongate inside the flow channel and providing a normal operation of the plate pack.

According to a preferred embodiment according to the present invention, a plate heat exchanger is used as a liquefied natural gas (LNG) vaporizer or evaporator. In LNG vaporizer according to the present invention, a first heat exchange medium comprises LNG to be heated and a second heat exchange medium may comprise water and/or glycol or any other suitable heating fluid. Temperature difference between LNG to be conveyed inside the plate pack and the heating fluid inside the outer casing of the plate heat exchanger may be even close to 200 degrees and the solutions of the plate heat exchanger according to the present invention are valuable to reduce thermal stress caused by the huge temperature differences.

A typical method for vaporizing liquefied natural gas (LNG) in the plate heat exchanger according to the present invention comprises arranging a heating medium to flow inside the shell between the inlet connection tube and the outlet connection tube for a second heat exchange medium, conveying liquefied natural gas inside the plate pack through the inlet connection tube for a first heat exchange medium, and conveying heated natural gas out from the plate pack through the outlet connection tube for the first heat exchange medium.

According to an embodiment of the present invention, a part of the heating medium flowing inside the shell is arranged to flow into a heating channel formed between the first support end plate of the plate pack and the first end plate of the outer casing and arranged at least partly to circulate the inlet connection tube for LNG. The heating channel is arranged in connection with inside the shell. In a typical method according to the present invention, a heating medium is guided to the heating channel from a side of the inlet connection for the heating fluid (a second heat exchange medium) and it flows out from the side of the outlet connection for the heating fluid.

Detailed Description Of The Drawings

FIG. 1 presents an exemplary embodiment of a structure of Plate and Shell heat exchanger, to which the improved end structures according to the present invention can be adapted. A plate heat exchanger 1 comprises a plate pack 2 and an outer casing surrounding the plate pack, which outer casing comprises a first end plate 3*a* and a second end plate 3*b* and a shell 4 connecting said first and second end plates. A plate pack 2 has been formed of heat exchanger plates 8, 8', 8", as presented in FIGS. 2-4, the heat exchange plates have at least two openings and arranged on top of each other, wherein the plate pack comprises a first end and a second end in the length/height direction of the plate pack, and the plate pack comprises a first support end plate 7*a* arranged on the first end of the plate pack and a second support end plate 7*b* arranged on the second end of the plate pack. The flow passages 9*a*, 9*b* for a first heat exchange medium inside the plate pack 2 are formed of the openings of the heat exchange plates arranged on top of each other. The plate heat exchanger further comprises an inlet connection tube 5*a* and an outlet connection tube 5*b* for a first heat exchange medium, which are arranged through the end plates of the outer casing and arranged in connection with the flow passages 9*a*, 9*b* of the plate pack. An inlet connection tube 6*a* and an outlet connection tube 6*b* for a second heat exchange medium are arranged through the outer casing and arranged in connection with the inside of the outer casing, i.e. with the outside of the plate pack.

Figure 2:
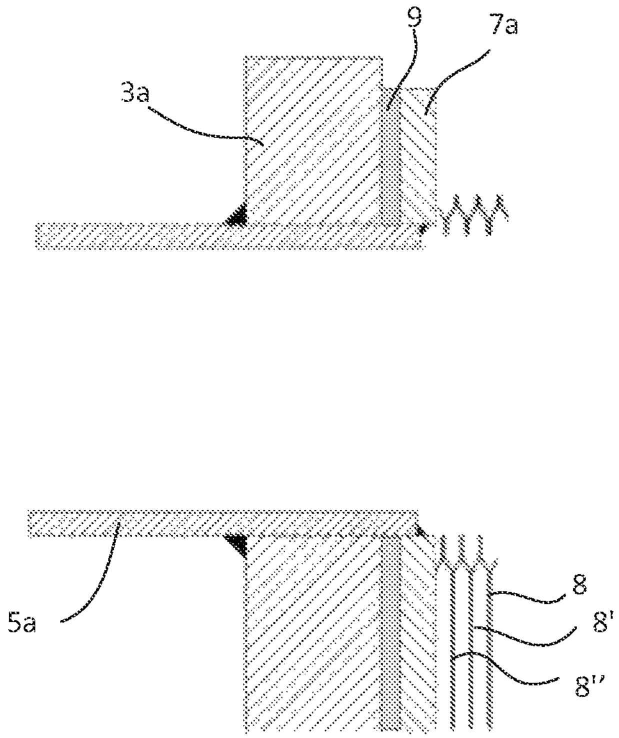
FIG. 2 shows a structure of the end of the plate heat exchanger according to an embodiment of the invention comprising a flexible structure between the support end plate of the plate pack and the end plate of the outer casing.

FIG. 2 presents a structure of the end of the plate heat exchanger according to an embodiment of the invention, which comprises a flexible structure 9 between the first support end plate 7*a* of the plate pack and the first end plate of the outer casing 3*a*.

Figure 3:
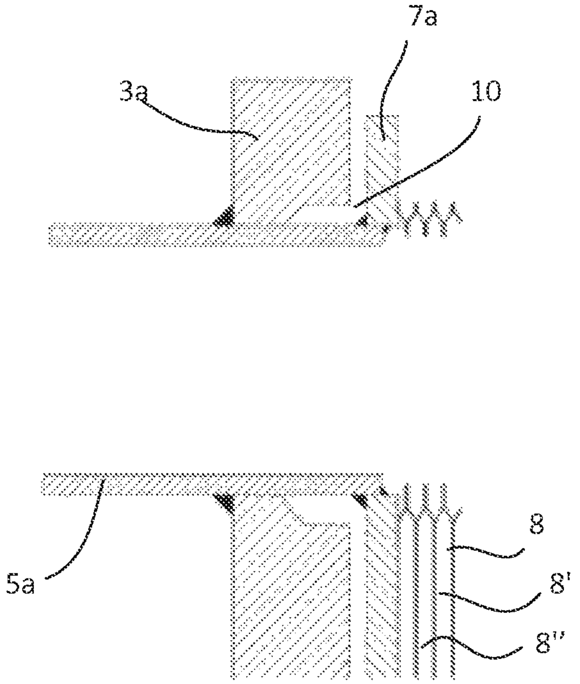
FIG. 3 shows a structure of the end of the plate heat exchanger according to an embodiment of the invention comprising a heating channel between the support end plate of the plate pack and the end plate of the outer casing.

FIG. 3 presents a structure of the end of the plate heat exchanger according to an embodiment of the invention, which comprises a heating channel 10. The heating channel 10 is arranged between the first support end plate 7*a* of the plate pack and the first end plate 3*a* of the outer casing. The heating channel 10 is also arranged to circulate the inlet connection tube 5*a*. The heating channel 10 can be arranged to be in connection with the inside of the shell, wherein a heating fluid or medium to be flown in the heating channel is same fluid or medium which flows inside the shell.

Figure 4:
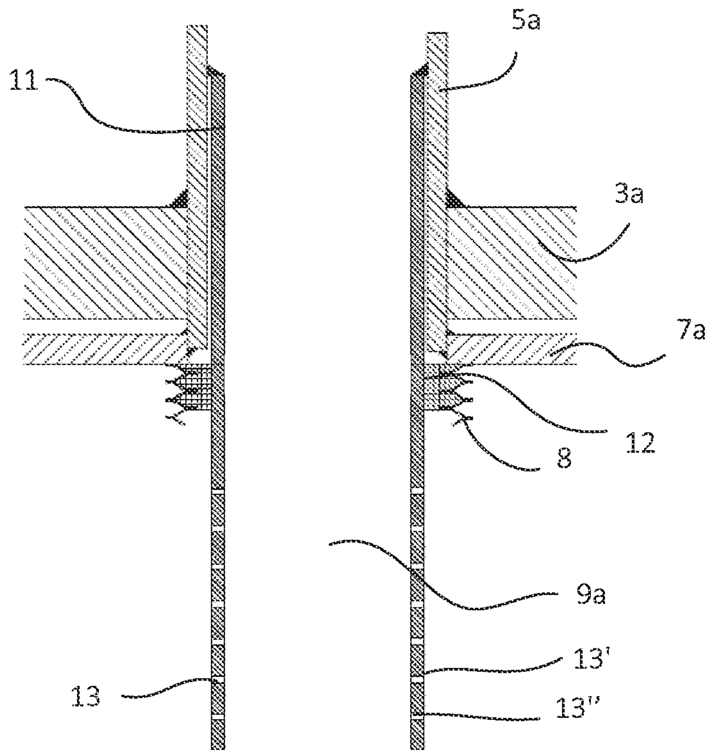
FIG. 4 shows a structure of the end of the plate heat exchanger according to an embodiment of the invention comprising an inner tube, which is arranged inside the inlet connection tube for the first heat exchange medium and which elongates at least partly inside the flow passage of the plate pack.

FIG. 4 presents a structure of the end of the plate heat exchanger according to an embodiment of the invention, which comprises an inner tube 11, which is arranged inside the inlet connection tube 5*a* for the first heat exchange medium. The inner tube 11 elongates at least partly inside the flow passage 9*a* of the plate pack. In a typical embodiment according to the present invention, an end of the inner tube 11 is attached to the inlet connection tube 5*a*. Inside the flow channel of the plate pack, the inner tube 11 is attached to the plate pack by a gasket or an elastic structure 12 arranged around the inner tube 11. A gasket or an elastic structure 12 is typically arranged to the structure around the inner tube so that it also closes the first flow channels between the plate pairs of the plate pack. According to an embodiment presented in FIG. 4, the inner tube 11 comprises openings 13, 13', 13" which forms flow channels into the flow channels inside the plate pack.

The invention claimed is:

1. A plate heat exchanger, which comprises a plate pack formed of heat exchanger plates having at least two openings and arranged on top of each other, wherein the plate pack comprises a first end and a second end in the length direction of the plate pack, and which plate pack comprises a first support end plate arranged on the first end of the plate pack, a second support end plate arranged on the second end of the plate pack and flow passages for a first heat exchange medium inside the plate pack are formed of the openings of the heat exchange plates arranged on top of each other, an outer casing surrounding the plate pack, which outer casing comprises a first end plate and a second end plate and a shell connecting said first and second end plates, inlet connection tube and outlet connection tube for the first heat exchange medium, arranged through an end plate of the outer casing and arranged in connection with the flow passages of the plate pack, and inlet connection tube and outlet connection tube for a second heat exchange medium arranged through the outer casing and arranged in connection with the inside of the outer casing, wherein the inlet connection tube of the first heat exchange medium is arranged through the first end plate of the outer casing and in connection with the first support end plate of the plate pack, and the plate heat exchanger further comprises an inner tube, which is arranged inside the inlet connection tube of the first heat exchange medium and which elongates at least partly inside the flow passage of the plate pack and comprises openings which form flow channels into the flow channels inside the plate pack, and 1-5 of the first flow channels inside the plate pack are closed, seen from the direction of the inlet connection tube of the first heat exchange medium, and the inner tube is attached to the plate pack inside the flow channel of the plate pack by a gasket arranged around the inner tube, the gasket blocking flow inside the flow passages of the plate pack and inhibiting thermal movement in the end structures of the plate heat exchanger.

2. The plate heat exchanger according to claim 1, wherein an end of the inner tube is attached to the inlet connection tube of the first heat exchange medium.

3. The plate heat exchanger according to claim 1, wherein the plate heat exchanger is liquefied natural gas vaporizer.

4. A liquefied natural gas vaporizer comprising the plate heat exchanger of claim 1.

* * * * *